US009836984B2

(12) United States Patent
Haseltine et al.

(10) Patent No.: US 9,836,984 B2
(45) Date of Patent: *Dec. 5, 2017

(54) STORYTELLING ENVIRONMENT: STORY AND PLAYGROUP CREATION

(71) Applicant: Disney Enterprises, Inc., Burbank, CA (US)

(72) Inventors: Eric C. Haseltine, Silver Spring, MD (US); Gary K.-W. Lau, SeaTac, WA (US); Theodore W.-Y. Leung, Bainbridge Island, WA (US); Jason E. Lewis, Seattle, WA (US); Guy A. Molinari, Shelton, WA (US); Deva D. Visamsetty, Redmond, WA (US); William D. Watts, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,230

(22) Filed: Sep. 15, 2014

(65) Prior Publication Data
US 2015/0079573 A1    Mar. 19, 2015

Related U.S. Application Data

(60) Provisional application No. 61/878,377, filed on Sep. 16, 2013, provisional application No. 61/878,413, filed on Sep. 16, 2013.

(51) Int. Cl.
G09B 5/06 (2006.01)
G06F 17/30 (2006.01)

(52) U.S. Cl.
CPC ........ G09B 5/06 (2013.01); G06F 17/30398 (2013.01)

(58) Field of Classification Search
CPC ..................................................... G09B 5/06
(Continued)

(56) References Cited

U.S. PATENT DOCUMENTS 7,246,315 B1 * 7/2007 Andrieu et al. .............. 715/706
9,253,774 B2    2/2016 Lim
(Continued)

FOREIGN PATENT DOCUMENTS

WO    2012153917 A2    11/2012

OTHER PUBLICATIONS

Fontijin, et al., "StoryToy the Interactive Storytelling Toy", 3rd International Conference on Pervasive Computing, 2005, 6 pages.*

Primary Examiner — Thomas Hong
(74) Attorney, Agent, or Firm — Patterson + Sheridan, LLP

(57) ABSTRACT

Embodiments provide techniques for dynamically creating a story for playback using a plurality of storytelling devices. Embodiments identify a plurality of storytelling devices available to participate in a storytelling experience. User input associated with the storytelling experience is received. Embodiments further include retrieving a story template based at least in part on the identified plurality of storytelling devices. Additionally, embodiments dynamically create a first story by mapping actions from the retrieved story template to storytelling devices in the plurality of storytelling devices, based at least in part on the received user input, such that the plurality of storytelling devices will perform a respective one or more actions during playback of the first story based on the mapped actions from the retrieved story template.

18 Claims, 10 Drawing Sheets

(58) Field of Classification Search
USPC .......................................................... 434/319
See application file for complete search history.

(56) References Cited

U.S. PATENT DOCUMENTS

| | | |
|---|---|---|
| 2003/0063619 A1 | 4/2003 | Montano et al. |
| 2004/0117190 A1* | 6/2004 | Baumert ................ G10L 15/26 704/275 |
| 2008/0013498 A1 | 1/2008 | Sugaya et al. |
| 2009/0088142 A1* | 4/2009 | Baribault et al. ............. 455/418 |
| 2009/0161622 A1 | 6/2009 | Sugaya |
| 2009/0238160 A1 | 9/2009 | Bhatti et al. |
| 2010/0195601 A1 | 8/2010 | Zhang |
| 2011/0314381 A1* | 12/2011 | Fuller et al. .................. 715/727 |
| 2012/0155349 A1 | 6/2012 | Bajic et al. |
| 2012/0157197 A1* | 6/2012 | Watkins et al. ................. 463/30 |
| 2013/0329690 A1 | 12/2013 | Kim et al. |
| 2014/0064252 A1 | 3/2014 | Lim et al. |
| 2014/0126558 A1 | 5/2014 | Kim et al. |
| 2014/0192696 A1 | 7/2014 | Wang et al. |
| 2015/0078232 A1 | 3/2015 | Djinki et al. |

* cited by examiner

STORYTELLING ENVIRONMENT: STORY AND PLAYGROUP CREATION

CROSS-REFERENCE TO RELATED APPLICATIONS

This application claims benefit of U.S. provisional patent application Ser. No. 61/878,377, filed Sep. 16, 2013, and Ser. No. 61/878,413, also filed Sep. 16, 2013, which are both herein incorporated by reference in their entirety.

BACKGROUND

Field of the Invention

The present invention generally relates to home entertainment, and more specifically to techniques for providing an immersive playtime environment using interactive devices.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Generally, embodiments presented herein provide techniques for creating an immersive storytelling environment using one or more storytelling devices (also referred to as interactive devices). More specifically, embodiments may use various storytelling devices, each capable of producing some auditory and/or visual effect, to create an immersive and interactive storytelling experience for a user. Such a system may include a variety of storytelling devices and a controller, connected via a network (e.g., an RF communications network). Each storytelling device generally represents any device capable of enhancing a storytelling experience, in response to user input (or some stimuli) a current context of a story. For instance, the controller device could configure the storytelling devices with stimulus and response information, based on a current context of a story. As an example, the controller device could configure a particular storytelling device to generate audiovisual messages responsive to a certain stimulus event (e.g., a user performing a particular action), and to perform another action responsive to other stimulus (e.g., the user not performing the particular action within a predefined window of time). Generally, the controller may be one of the plurality of storytelling devices, or the controller could be a standalone device (e.g., a computing device executing a control application).

Figure 1:
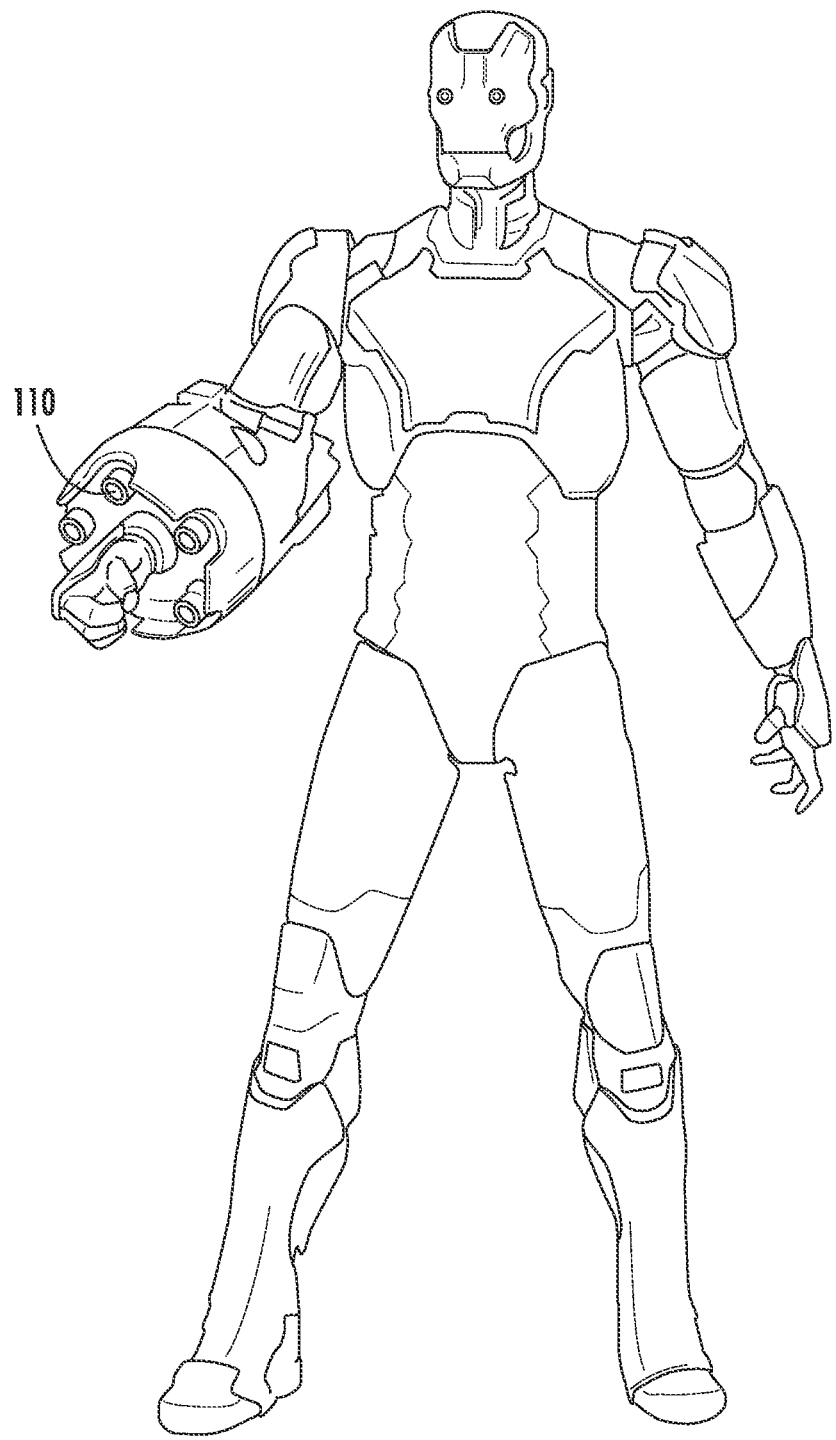
FIG. 1 illustrates a storytelling device, according to one embodiment described herein.

One embodiment provides interactive devices and techniques for providing an immersive play experience for users. For instance, one embodiment provides interactive action figures which are capable of performing actions and reacting to actions performed by other action figures or by a user. An example of such a device is shown in FIG. 1, which depicts an Iron Man® action figure configured to interact within an immersive play environment. For example, the Iron Man® action figure includes an infrared transmitter capable of transmitting coded infrared signals that simulates a blast from Iron Man's "repulsor ray." Generally, the coded infrared signals represent any infrared signals that include a data value(s) identifying the signal as pertaining to one of the interactive devices. In one embodiment, the signal is coded such that it identifies it originated from the Iron Man® type of action figure.

Figure 2:
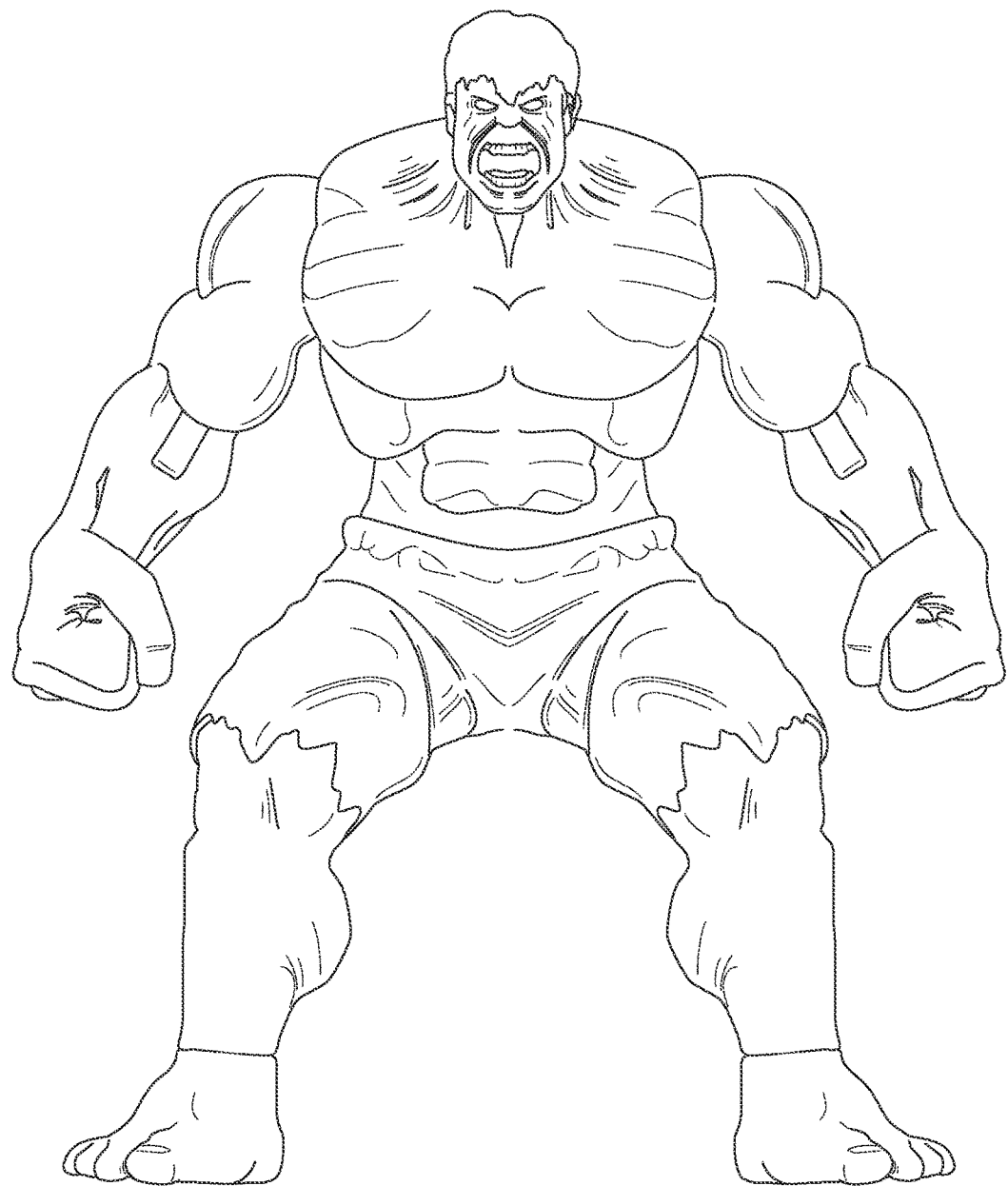
FIG. 2 illustrates a storytelling device, according to one embodiment described herein.

Other devices within the environment may receive these coded infrared signals and may react accordingly. For example, the Hulk® action figure shown in FIG. 2 could include an infrared receiver for detecting the infrared signal. Moreover, logic for the Hulk® action figure could then process the infrared signal and could determine that the signal represents a blast from Iron Man's repulsor ray. The logic could then perform an action in response to receiving the coded infrared signal. For example, the logic could update a state for the Hulk® action figure to indicate that a repulsor ray hit has been received. For instance, the Hulk® action figure could be configured to perform an action after receiving each repulsor ray hit, where the action is determined based on how many hits the action figure has already received. As an example, for the first repulsor ray hit, the Hulk® action figure could be configured to output a prerecorded roaring sound (e.g., using one or more speakers associated with the action figure). Upon receiving a second repulsor ray hit, the Hulk® action figure could be configured to manipulate its arms and head, in addition to outputting a roaring sound. After receiving a third repulsor ray hit, the Hulk® action figure could be configured to rock back and forth, and after receiving a fourth repulsor ray hit, the Hulk® action figure could be configured to fall over on the table.

Figure 3:
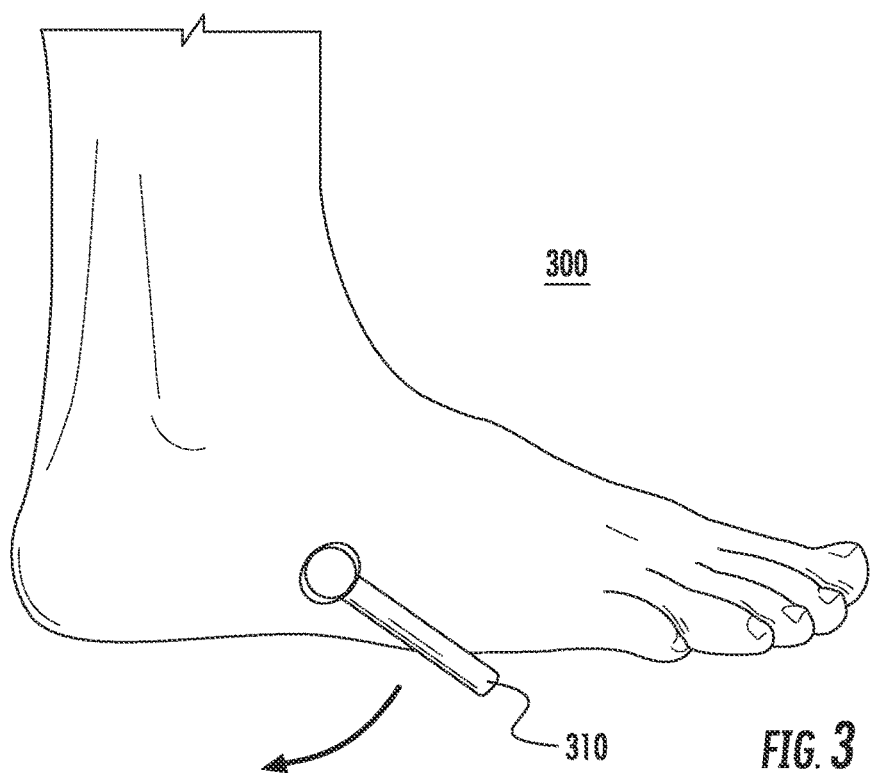
FIG. 3 illustrates a rotatable arm within a storytelling device, according to one embodiment described herein.

An example of such a rocking motion is shown in FIG. 3, which illustrates a foot of an action figure configured to perform a rocking motion. Here, the foot 300 includes a rotating arm 310 which, in its resting position, is even (or above) the base of the foot. That is, the arm 310 can be positioned such that the foot will sit flat on the surface (e.g., a table top), allowing the action figure (e.g., the Hulk® action figure) to stand in a stationary position on the surface. The arm 310 may be attached to a servomechanism which provides the movement of the arm 310. In this embodiment, the arm 310 may be manipulated to move in the clockwise direction, causing the action figure to shift its position on the surface. The arm's 310 rotation could be controlled to manipulate the action figure's movement. For example, the arm 310 could be rotated in the clockwise direction slightly and then returned to the resting position in order to cause the action figure to rock back and forth on the surface. In one embodiment, rotating arms 310 within each foot of the action figure could alternate slight rotations, in order to cause the action figure to shift from one foot to the other. As another example, the arm 310 could be rotated substantially in the clockwise direction, in order to cause the action figure to fall over onto the surface. Of note, while the above examples relate to Marvel® themed action figures and reacting to incoming blasts from a repulsor ray, such examples are for illustrative purposes only and are without limitation. More generally, the rotating arm 310 could be used to introduce movement into any action figure or device, responsive to the action figure or device entering a certain state (e.g., upon receiving a predefined number of coded infrared signals).

Figure 4:
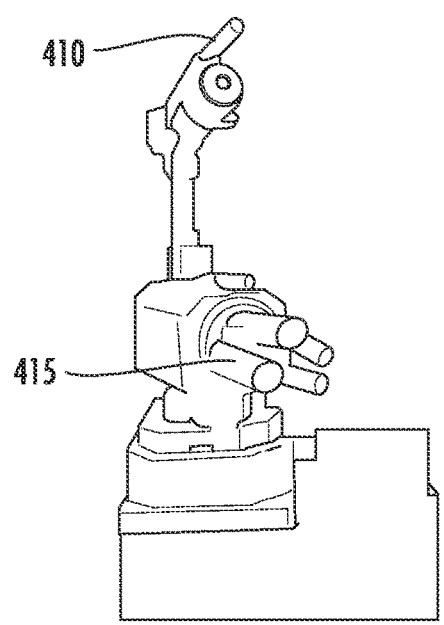
FIG. 4 illustrates a foam dart turret storytelling device, according to one embodiment described herein.

In addition to infrared signals, embodiments may interact with one another using physical projectiles. An example of such an embodiment is shown in FIG. 4, which illustrates a bore-sighted turret configured to fire foam darts. Here, the turret includes a bore-sighted video camera 410 and a number of foam darts 415. In the depicted embodiment, the camera 410 is positioned such that the camera 410 moves in conjunction with the orientation of the foam darts 415, allowing a user to see aim the foam darts 415 at a target. For example, the turret could be controlled using a software application (e.g., executing on a remote computing device), and the software application could output a video stream with a targeting reticule for use in aiming the foam darts 415. The foam darts 415 could be launched using a pneumatic apparatus. For example, each be mounted onto a hollow cylinder and, upon receiving a signal to fire one of the darts 415, the turret could shoot a burst of air into the corresponding cylinder, causing the dart 415 to launch. More generally, however, any device for aiming and launching projectiles may be used in accordance with the techniques described herein.

In one embodiment, the interactive devices are configured to detect and respond to hits from physical projectiles. For instance, the Hulk® action figure could be configured to detect and react to hits from the foam darts 415 (e.g., in a similar fashion to hits from the coded infrared signals representing repulsor ray blasts). For example, the Hulk® action figure could include an accelerometer and could be configured with logic to detect readings from the accelerometer matching a particular signature that corresponds to hits from the foam darts 415. That is, the accelerometer may produce a certain pattern of readings when the Hulk® action figure is struck with one of the foam darts 415, and the Hulk® action figure could be configured to determine that a foam dart has struck the Hulk® action figure upon detecting such a pattern of readings from the accelerometer. Advantageously, doing so allows the Hulk® action figure to react to hits from physical projectiles such as the foam darts 415, and further allows the Hulk® action figure to distinguish between general movements (e.g., a user handling the Hulk® action figure) and strikes from physical projectiles.

For instance, upon detecting accelerometer readings matching the signature of a foam dart strike, logic for the Hulk® action figure could cause the Hulk® action figure to output the roaring sound effect and to vibrate, simulating the action figure shaking with rage. In one embodiment, the vibration effect is achieved using a speaker within the action figure. For example, the speaker could produce a low frequency, high amplitude sound effect that causes the action figure to vibrate. Moreover, the action figure could be balanced such that the vibration causes the action figure to move in a particular way. For example, the Hulk® action figure could have an asymmetrical balance, such that more weight is to the rear of the toy (i.e., the Hulk® action figure's back) than is at the front of the toy (i.e., the Hulk® action figure's chest). When the Hulk® action figure then begins vibrating, the weight differential could cause the Hulk® action figure to move backwards.

For instance, upon detecting a strike from a foam dart, the Hulk® action figure could output a sound effect (e.g., a roaring sound) using a first speaker within the Hulk® action figure, and the Hulk® action figure could then begin vibrating using a second speaker, causing the Hulk® action figure to vibrate and move backwards on the surface (e.g., the table top). In one embodiment, a platform could be provided for the Hulk® action figure, such that when the Hulk® action figure move backwards for a sufficient distance through the use of the speaker, the Hulk® action figure could fall off the platform and fall over onto the surface (e.g., a table surface on which the platform is sitting). For example, the Hulk® action figure could be configured to move backwards a particular amount (i.e., through the use of speaker-induced vibration) responsive to each hit (e.g., detecting a coded infrared signal indicating a blast from Iron Man's® repulsor ray). As the Hulk® action figure moves backwards after each hit, the Hulk® action figure could fall off the platform after a certain number of hits, causing the Hulk® action figure to fall over. Advantageously, doing so provides a low cost way of introducing vibration and movement into a device, and provides a more realistic and immersive play experience as the Hulk® action figure appears to reel backwards and eventually fall over from the impact of foam darts and "repulsor ray" blasts.

Figure 5:
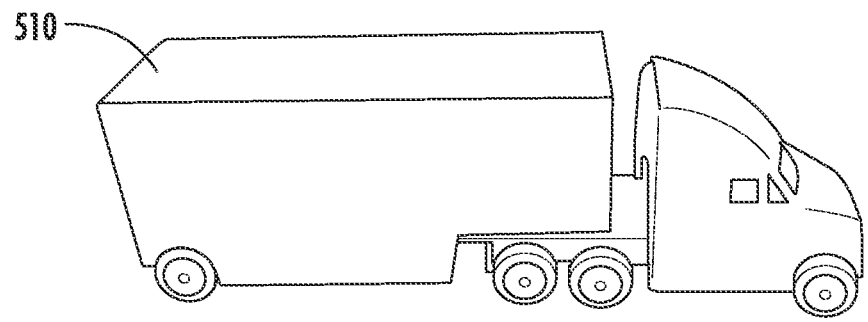
FIG. 5 illustrates an exploding vehicle storytelling device, according to one embodiment described herein.

Another example is shown in FIG. 5, which includes a toy vehicle 510. As shown, the toy vehicle 510 is assembled using a number of spring-loaded pieces, and includes a mechanism for releasing the spring-loaded pieces, causing the toy vehicle 510 to disassemble. For example, logic associated with the toy vehicle 510 could maintain a count of how many hits the toy vehicle 510 has sustained (e.g., hits from foam darts, hits from coded infrared signals, etc.), and upon the count exceeding a predefined threshold of hits, the toy vehicle 510 could trigger the mechanism to release the spring-loaded pieces, causing the toy vehicle 510 to appear to explode in response to the most recent hit (e.g., the toy vehicle 510 disassembling responsive to a strike from one of the foam darts 415). Additionally, such a trigger could be accompanied by lighting and/or acoustic effects in order to enhance the realism of the explosion. For example, the triggering of the mechanism could be accompanied by a speaker within the toy vehicle 510 could output an explosion sound effect, while lights within the spring-loaded pieces of the toy vehicle 510 flash. Advantageously, doing so creates the appearance of the toy vehicle 510 exploding, responsive to a particular event (e.g., a strike from a foam dart). Of note, while the depicted embodiment is a toy vehicle, it is broadly contemplated that the techniques described herein are not limited to vehicles and may be adapted to producing a visual response from any type of object.

Figure 6:
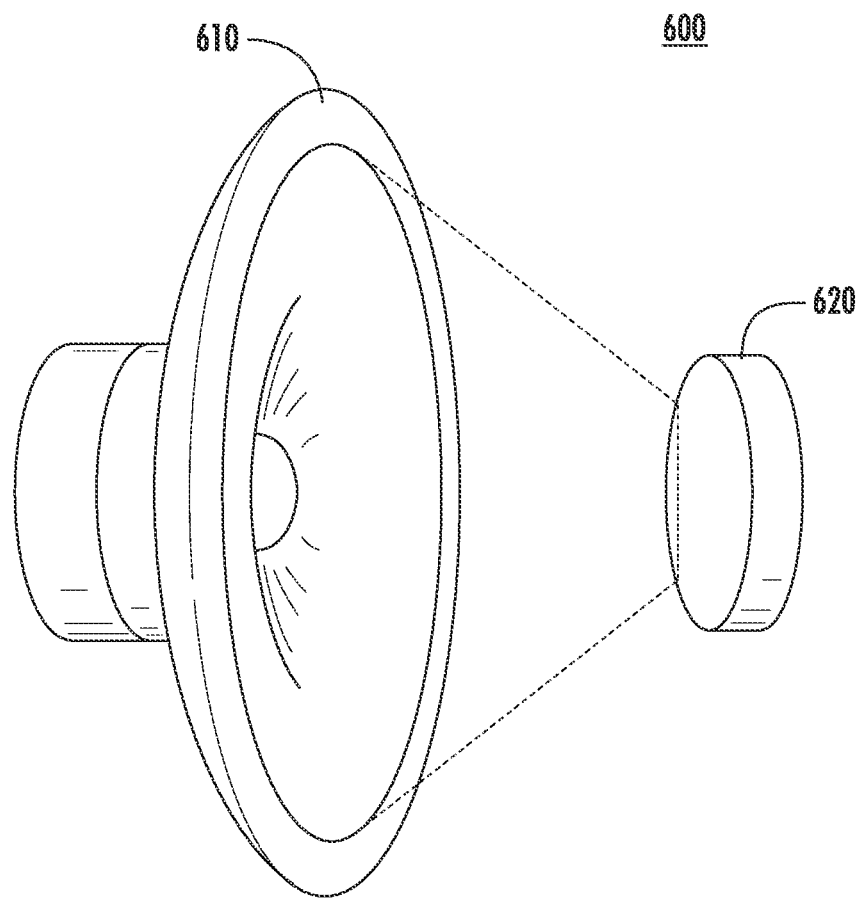
FIG. 6 illustrates an interaction between a speaker and a depressible mechanism, according to one embodiment described herein.

In one embodiment, a speaker within the toy vehicle 510 can be configured to trigger the mechanism that releases the spring-loaded pieces, causing the toy vehicle 510 to disassemble. An example of this is shown in FIG. 6, which shows a system 600 that includes a speaker 610 and a release mechanism 620. Here, the release mechanism 620 is positioned such that a diaphragm of the speaker 610 will depress the release mechanism 620, when sounds of certain frequencies and amplitudes are played through the speaker 610. For example, the release mechanism 620 could be depressed by the diaphragm of the speaker when low frequency, high amplitude sounds are played through the speaker 610. However, the playback of other sounds through the speaker 610 may not induce sufficient movement in the diaphragm to depress the release mechanism 620, allowing the speaker 610 to be used for multiple purposes (i.e., sound playback as well as release mechanism 620 activation).

Thus, for example, a user could control the turret shown in FIG. 4 using a software application and the bore-sighted camera device 410, and could launch the foam darts 415 at the vehicle 510. The vehicle 510 could detect hits from the foam darts by determining that readings from an accelerometer within the vehicle 510 match a predefined accelerometer signature corresponding to a physical projectile striking the vehicle 510. In response to detecting the vehicle 510 has received a number of hits exceeding a predefined threshold amount of hits, the vehicle 510 could cause the speaker 610 to emit a particular sound, such that the diaphragm of the speaker 610 depresses the release mechanism 620. In response to the release mechanism 620 being triggered, the spring-loaded parts that make up the vehicle 510 could be released, causing the vehicle 510 to disassemble and appear to explode. The vehicle 510 could also output an explosion sound and could trigger a number of light effects, further enhancing the explosion effect. Advantageously, doing so provides a fun and immersive playtime experience using the interactive devices.

Figure 7:
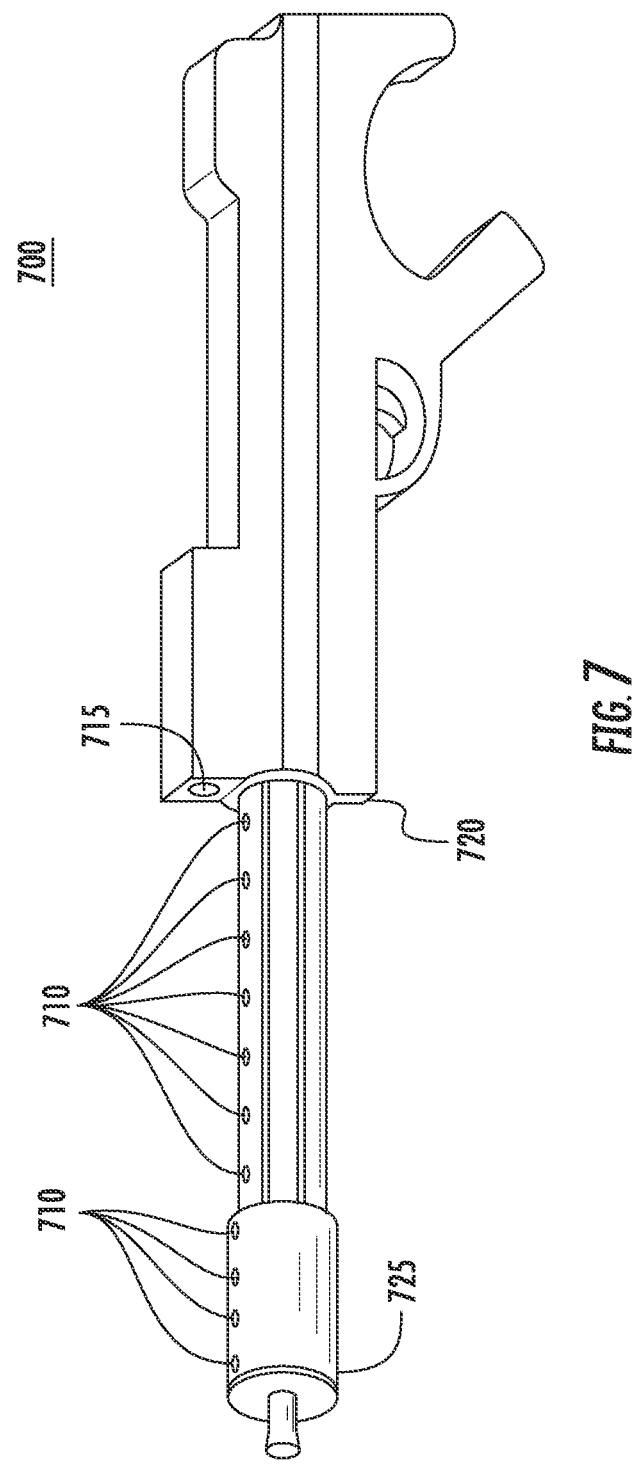
FIG. 7 illustrates a toy blaster storytelling device, according to one embodiment described herein.

In addition to interactions between the devices (e.g., the Hulk® action figure, the Iron Man® action figure, the exploding vehicle 510, etc.), the devices may be configured to interact with users as well. For example, a user could manipulate a toy blaster configured to shoot coded infrared signals and could interact with the interactive devices by firing the toy blaster at the devices (e.g., causing the Hulk® action figure to vibrate, causing the exploding vehicle 510 to vibrate and even disassemble itself, etc.). An example of such a device is shown in FIG. 7, which illustrates a Star Wars®blaster toy 700 that includes an infrared emitter device 715 and a multitude of lights 710. The infrared emitter device 715 can be configured to transmit coded infrared signals in the direction the blaster rifle 700 is aimed, responsive to a user manipulating a trigger of the blaster rifle 700.

The lights 710 can be used to create an optical illusion of a "corpuscle" or beam of light traversing the air, so as to simulate a laser pulse gun effect (e.g., as in the movie Star Wars®). Generally, the lights 710 can be any devices adapted to emit light (e.g., a light emitting diode). Here, the blaster rifle 700 may illuminate the lights 710 in sequence, starting from the base-end 720 of the barrel and continuing to the muzzle-end 725 of the barrel, responsive to a user depressing the trigger device of the blaster rifle 700. By illuminating the lights in sequence, the blaster rifle 700 can produce an illusion of motion in a beam of light emitting from the rifle 700. Moreover, the speed at which the sequence of lights illuminates and the duration each light remains light can be adjusted, depending on the visual effect desired. In one embodiment, the speed and the duration each light remains lit are equal, such that each light after the first light is illuminated as the previous light is extinguished. Additionally, the lights could be covered with a material adapted to disperse the light in order to enhance the visual effect (i.e., creating the visual effect of a "beam" of light, rather than a sequence of individual lights).

Figure 8:
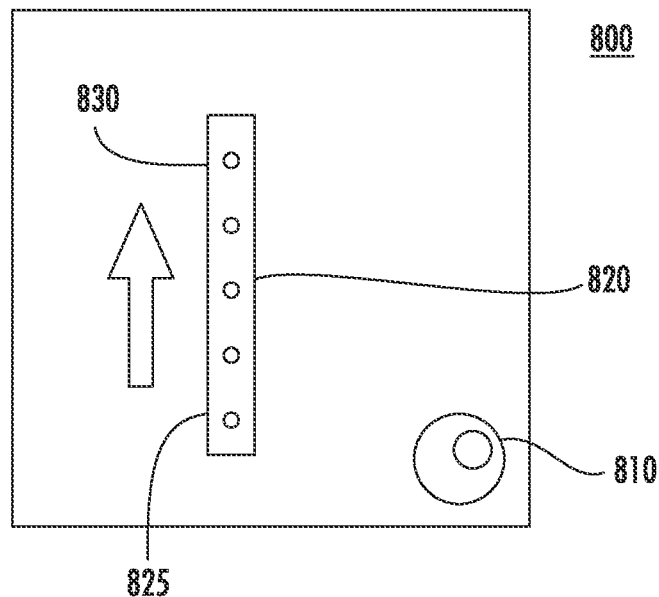
FIG. 8 illustrates a target storytelling device, according to one embodiment described herein.

As discussed above, a coded infrared signal can also be transmitted (e.g., using the transmitter 715), responsive to the user depressing the blaster rifle's trigger. In one embodiment, a target device is configured to receive such an infrared signal and, in response, to create a sequence of lights on the target device, in order to continue the optical illusion of the corpuscle or beam of light traversing the air. An example of such a target device is shown in FIG. 8, which illustrates a target device 800 configured with an infrared receiver 810 and a sequence of lights 820. The infrared receiver 810 could be configured to receive the coded infrared signal from the blaster rifle 700 and, in response, to initiate a sequence of illuminating the lights 820 in order to continue the optical illusion produced by illuminating the lights 710 in sequence. For example, the lights 820 could be illuminated in sequence from the bottom portion 825 to the top portion 830. Moreover, the speed at which the sequence progresses from one light to the next may be configured, depending on the visual effect desired. In one embodiment, each light in the sequence after the first is configured to illuminate when the previous light in the sequence is extinguished. Advantageously, by tying the sequences of lights 820 and 710 together, embodiments can create an illusion of motion for a "beam" of light emitting from the blaster rifle 700 and going into the target 800 (e.g., similar to the blasts of light in the Star Wars® movie franchise).

Figure 9:
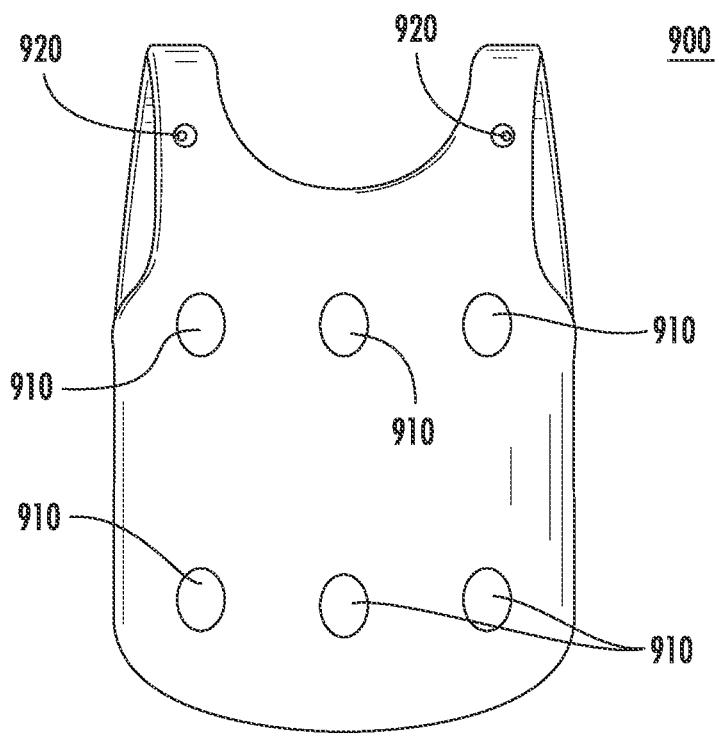
FIG. 9 illustrates a haptic feedback vest storytelling device, according to one embodiment described herein.

One embodiment provides a haptic feedback vest, configured to interact with the interactive devices described herein. An example of such a vest is shown in FIG. 9, which depicts a vest 900 configured with a plurality of speaker elements 910 and infrared receivers 920. In one embodiment, the vest 900 is configured with a sequence of lights, similar to the lights 820 on the target device 800. Such lights could be used to continue an optical illusion created by another device, such as the blaster rifle 700. Here, each of the speakers 910 is configured to emit a sound configured to produce a vibration (e.g., a low frequency, high amplitude sound), responsive to a trigger event.

For example, one of the infrared receivers 920 could receive a coded infrared signal from the blaster rifle 700, and logic for the haptic vest 900 could determine a direction from which the infrared signal was received. Generally, any technique for determining the blaster rifle's 700 position relative to the vest 900 may be used, consistent with the functionality described herein. The logic could then determine one or more of the speaker devices 910 oriented in the direction of the blaster rifle 700, and could cause the determined one or more speaker devices 910 to emit a sound configured to produce a vibration. Advantageously, doing so provides haptic feedback to the wearer of the vest, enhancing the realism of getting "shot" with the toy blaster. Similarly, the haptic vest 900 could provide haptic feedback (e.g., by causing one of the speakers 910 to vibrate) responsive to the vest 900 being struck by, for example, one of the foam darts 415 or by a coded infrared signal corresponding to the Iron Man® action figure's repulsor ray, and may provide the feedback using speakers oriented in the direction of the source of the strike (e.g., in the direction of the foam dart turret or the Iron Man® action figure).

In a particular embodiment, the coded infrared signals may include type information and the vest 900 could use the type information to determine the appropriate haptic response for the received signal. For instance, the vest 900 could alter the duration, intensity and/or number of speakers 910 used to provide haptic feedback for the signal, based on the type of the signal. For example, for an infrared signal of the "Star Wars® blaster rifle" type, the haptic vest 900 could trigger a brief vibration using one of the speaker devices 910 in the direction of the signal's source. As another example, for an infrared signal of the "foam missile" type (e.g., one of the foam darts 415), the vest 900 could simulate an explosion by triggering a longer duration vibration in a number of the speaker devices 910, in the direction from which the foam dart originated. As yet another example, for an infrared signal of the "repulsor ray" type (e.g., from the Iron Man® action figure), the vest 900 could simulate a sustained ray by causing one of the speakers 910 in the direction from which the signal was received to vibrate for a sustained period of time. Doing so helps to enhance the realism of the interactive play experience, as the user receives haptic feedback corresponding to the type of attack the user sustained.

While the above examples refer to a vest designed to provide haptic feedback to the wearer, such an example is provided for illustrative purposes only and without limitation. More generally, embodiments may be configured to provide haptic feedback with any sort of worn garment or article. Examples of such articles include body armor, helmets, dresses, gloves, shoes and so on. For instance, one embodiment provides a glove for use in controlling other objects and interactions, and such a glove may be configured to also provide haptic feedback to the user through the aforementioned techniques or analogous techniques.

For example, a glove could be configured as a radio controlled (RC) vehicle controller and could be used to simulate a user having "force" powers in a Star Wars@-themed storytelling environment. For example, a force glove storytelling device could include sensors configured to detect the movement of the glove, and the glove could further include a transmitter device (e.g., a radio frequency (RF) transmitter) configured to transmit commands when predefined glove movements are performed. For instance, the toy vehicle 510 could be configured with an RF receiver for receiving commands from the force glove storytelling device. In such an example, the glove storytelling device could detect when the user points his hand wearing the force glove at the toy vehicle 510 with the user's fingers extended, and could transmit commands to control the movement of the toy vehicle 510 responsive to the movement of the user's hand. For instance, if the user moves his hand to the left, the toy vehicle 510 could be configured to drive in the direction of the hand movement (e.g., the leftward direction from the user's perspective), and the vehicle 510 could continue moving until the movement of the user's hand ceases. Moreover, haptic feedback could be provided to the user through the glove, e.g., through the use of one or more speakers configured to produce vibrations. For instance, such feedback could be provided as the user moves the toy vehicle 510, and could cease when the movement of the vehicle 510 ceases.

In addition to controlling the movement of other storytelling devices, such a force glove can be configured to control other actions of the other storytelling devices as well. For example, the glove storytelling device could detect when the user points the hand wearing the force glove at the toy vehicle 510, and upon detecting the user has clinched his fist wearing the force glove (i.e., a predefined action has been performed), could trigger the exploding mechanism (e.g., the mechanism shown in FIG. 6) to cause the toy vehicle 510 to explode into a number of pieces (i.e., a predefined response corresponding to the performed action). Doing so provides a fun and intuitive way for remotely controlling the storytelling devices. Additionally, haptic feedback could be provided through the glove as the vehicle is exploding, further enhancing the storytelling experience.

Figure 10:
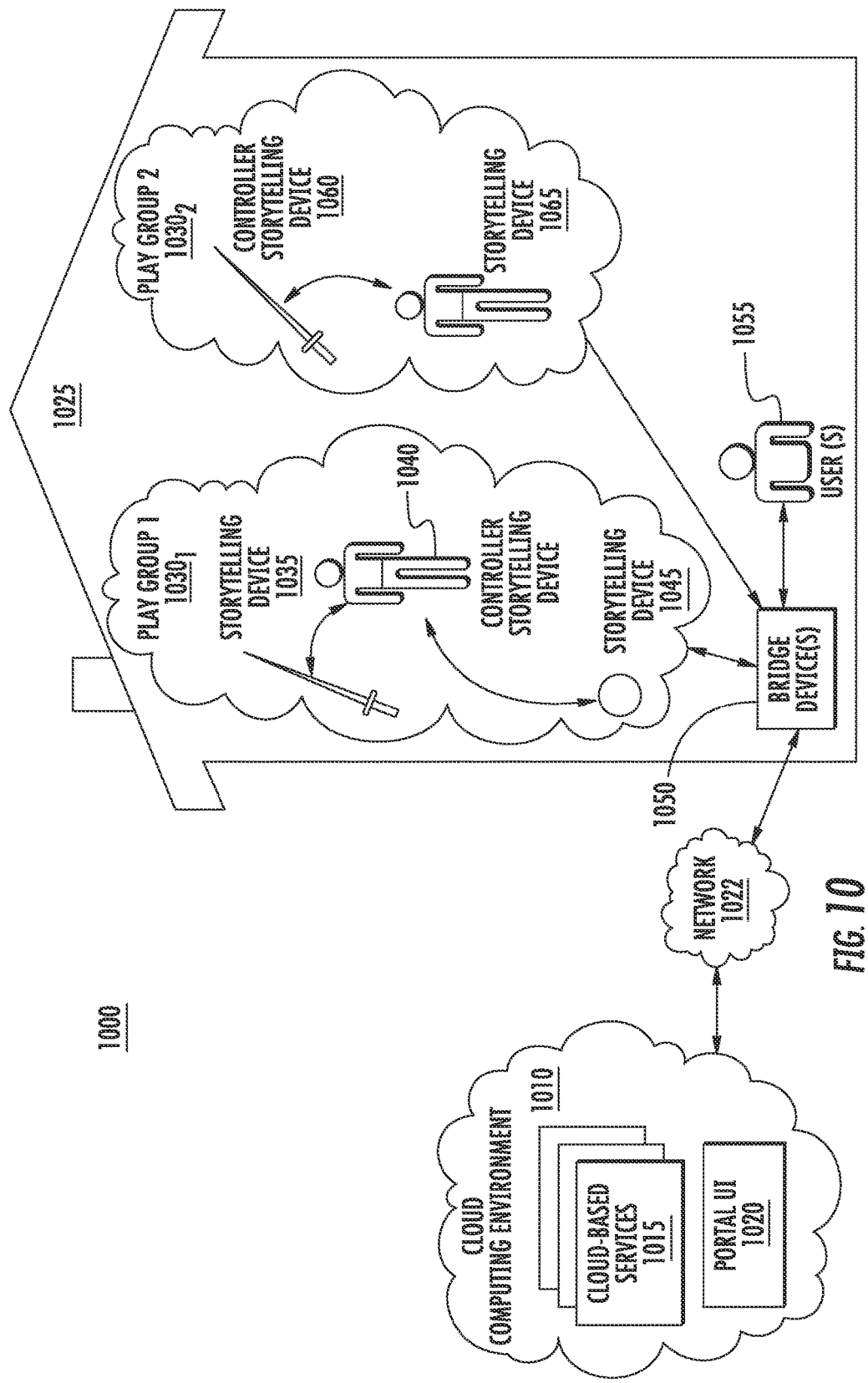
FIG. 10 illustrates a storytelling environment with a plurality of playgroups, according to one embodiment described herein.

FIG. 10 illustrates an example storytelling environment, according to one embodiment. As shown, the environment 1000 includes a cloud computing environment 1010 and a home environment 1025, interconnected via network 1022. The home environment 1025 includes two playgroups 1030$_{1-2}$ of storytelling devices, as well as a user(s) 1055 and a bridge device(s) 1050. Here, the user may connect to the bridge device 1050 via an application (e.g., executing on a mobile device, rendered within a web browser, etc.). The cloud computing environment 1010 hosts a plurality of services 1015 and a portal user interface 1020.

Generally, cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access information and the services 1015 from any computing system attached to a network connected to the cloud (e.g., the Internet).

Each playgroup $1030_{1-N}$ generally represents a set of storytelling devices involved in a unique storytelling or playtime experience. For instance, the playgroup $1030_1$ represents a science fiction-themed storytelling experience and includes a light sword storytelling device 1035, an action figure controller storytelling device 1040, and a trainer storytelling device 1045. Likewise, the playgroup $1030_2$ also represents a science fiction-themed storytelling experience and includes a light sword controller storytelling device 1060 and an action figure storytelling device 1065. More generally, however, the playgroups may contain any number of storytelling devices of any number of different themes and types.

Generally, the playgroups 1030 include storytelling devices within a particular physical location (e.g., a room of the house environment 1025). That is, it may be preferable for a storytelling experience to only interact with storytelling devices within its immediate physical proximity (e.g., within the same room), as to do otherwise can potentially create security and other problems during the storytelling experience. A number of different techniques may be used to determine which storytelling devices are within immediate physical proximity of one another. For example, one or more of the storytelling devices could emit a first signal (e.g., an infrared signal) and the other storytelling devices could be configured to transmit a response (e.g., a radio frequency signal (RF)) upon receiving the first signal. The storytelling device(s) could then receive the responses from the other storytelling devices and could create a playgroup 1030 that includes the other storytelling devices as well as the one or more storytelling devices.

Generally, it is advantageous for the first signal to be transmitted using a technique that does not readily pass through barriers such as the walls of a house (e.g., emitting infrared light), so as to detect only nearby storytelling devices that are within the same physical environment as the storytelling device. That is, while particular signals (e.g., RF signals) may be suited for inter-device communications, these signals may not be ideal for detecting nearby storytelling devices as they may readily permeate through barriers such as the walls of the house. Doing so helps to ensure that a storytelling experience will not make use of storytelling devices in different rooms of a residence or potentially within different residences altogether.

As shown, the devices 1040 and 1060 have been elected as controller devices within the playgroups $1030_{1-2}$. Generally, a controller device configures each of the storytelling devices within a playgroup to perform certain actions in response to a detected stimulus event and a current context of the story being told. Here, the story may include a number of different contexts in a temporal order, and the playback of the story may advance from one context to the next until the last context is reached and the storytelling experience is complete. However, while the story may be linear in progression, this is not necessary. For example, a story could have different branches, where the story can proceed down one of many possible arcs. For instance, arcs could be randomly selected, selected based on a user's request (e.g., the user specifying which arc should be taken), selected based on the user's actions (e.g., the user manages to "rescue" one of the fictional characters in the story), selected based on the user's history of actions (e.g., whether the user is trending towards the "dark side" in a science fiction storyline), and so on. Moreover, the story may be modified dynamically during playback based on various actions, such as one of the storytelling devices becoming unavailable (e.g., losing power, leaving the physical environment, etc.) or a new storytelling device being introduced to the environment (e.g., the user's friend comes over to play, bringing one or more new storytelling devices with him).

Additionally, the controller may maintain state information and control game logic for the playgroup 1030. For example, playgroup $1030_1$ could be playing out a story in which a user is asked by the action figure device 1040 to deflect virtual laser beams fired from the trainer device 1045, using the light sword device 1035. Here, the elected controller device (i.e., action figure 1040) could maintain a "hit points" value for the user that is decremented when the user fails to deflect one of the virtual lasers, and could further maintain a count of how many virtual lasers the user has deflected thus far. Additionally, the controller could retrieve state data for the user (e.g., by querying one of the cloud-based services 1015 with an identifier for the user) and could use the user state data to adjust the playback of the story.

In addition to detecting nearby storytelling device within the same physical environment, the storytelling devices within a playgroup 1030 may elect one of the storytelling devices as a controller storytelling device. A number of different techniques may be used for such an election. For example, a user could explicitly specify that a particular one of the storytelling devices (e.g., the user's favorite device) should be used as the controller. Here, it may be preferable for the user to select a device that will remain with the user throughout the storytelling experience, so as to avoid a subsequent controller election part-way through the story. In one embodiment, the controller may be elected based on technical specifications and properties of the storytelling devices. For example, a storytelling device with a substantial amount of memory, processing power and communication bandwidth may be preferable as the controller, relative to a device having a lesser amount of computing resources.

As discussed above, the story may generally include stimulus events and corresponding actions, and may be linear in progression or dynamic (e.g., a story that includes different story arcs or branches). In one embodiment, the story may be defined such that each corresponding action is attribute to a type or role of storytelling device (i.e., as opposed to a specific storytelling device). In mapping the story to the available and compatible storytelling devices, the controller device 1020 could determine a type of each of the storytelling devices, and could assign particular stimulus events and corresponding actions to each of the storytelling devices based on the determined type. For example, a particular story could state that an action should be performed by a storytelling device having the role of "Hero", and the controller could map the action onto a storytelling device within the playgroup having the role "Hero".

For instance, assuming that the storytelling device 1040 represents a first fictional character action figure, the controller 1040 could assign any stimulus events and actions within the story that are specific to the fictional character to the action figure 1040. Likewise, if the story includes any stimulus events and actions designated for a hero-type character in the science fiction universe, the controller 1040 could assign these stimulus events and the corresponding actions to the device 1040 as well. In the event multiple storytelling devices are available that satisfy the criteria for a stimulus event/action combination (e.g., multiple hero devices are present and available within the playgroup), the controller 1040 could select one of the storytelling devices to perform each of the stimulus event/action combinations. The controller could use a number of different techniques for mapping the actions to the compatible devices, including a random mapping algorithm, a load balancing algorithm (e.g., round robin), user preferences (e.g., assigning more actions to a device the user has identified as his favorite), explicit user instructions (e.g., allowing a user to customize the story, such as selecting which character will narrate the story), and so on. Advantageously, dynamically mapping the story onto the available and compatible devices allows the story to be used with various different storytelling devices and combinations of storytelling devices.

In one embodiment, the story may specify a distinct, contextually appropriate action to perform for various types of storytelling devices for a given stimulus event. That is, the controller could determine that a particular story includes a stimulus event designated for a hero character, and could specify a corresponding action designated for a action figure 1040 and a separate, distinct action designated for an different hero character-based device. In such an embodiment, upon selecting one of the devices to respond to the stimulus event, the controller could assign the corresponding action to the device based on the device's type. Doing so helps to create a more immersive and realistic storytelling experience for the user, as the storytelling devices can be configured to react to stimulus events in a manner appropriate for the represented fictional character.

Once the controller maps the story onto the devices, the controller configures each of the storytelling devices with a number of stimulus events and corresponding effects relating to a first context of the story. As an example, the action figure 1040 could detect when the user has successfully deflected a virtual laser fired from the storytelling device 1045 (i.e., an occurrence of the stimulus event), and could audibly congratulate the user in response (i.e., performing the corresponding effect).

Figure 11:
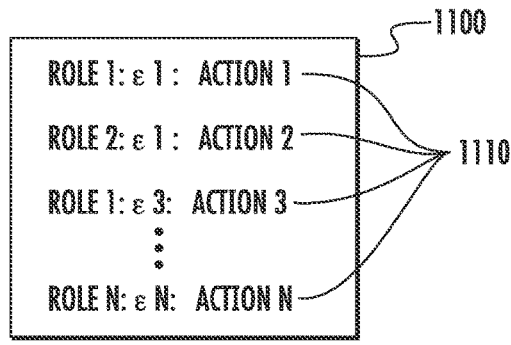
FIG. 11 illustrates a story, according to one embodiment described herein.

As discussed above, in addition to defining roles associated with each stimulus event, the story may also define a corresponding action to be performed in response to the stimulus event. For instance, the story could explicitly define dialogue to be audibly output by a device matching the defined role. In one embodiment, the story defines a class of action that should be performed by a storytelling device, in response to a corresponding stimulus event. An example of such an embodiment is shown in FIG. 11, which depicts a story 1100 having a number of "role/event/action" sets. For example, the depicted story could play in linear order, where a device with "Role 10" performs "Action 10" in response to event "E1". Of course, the depicted story is without limitation and provided for illustrative purposes only, and it is broadly contemplated that other stories may be more dynamic, including a number of conditional branches and storyline arcs, multiple actions to be performed responsive to a particular stimulus event (all together, in the alternative, etc.) and so on.

In playing out the story 1100, the controller could determine that two devices within the playgroup 1030 have the role "Role 10", and could select one of the two devices to perform "Action 10" in response to detecting the event "E1". Here, "Action 10" may refer to a class of action, and the specific action performed may vary from one storytelling device to the next. For example, assume that the event "E1" is the user failing to deflect a virtual laser, fired from the device 1045, using the lightsaber device 1035. Here, the action "Action 10" could refer to a class of action generally designed to encourage the user to try again. However, each of the storytelling devices may potentially implement the action "Action 10" in a different way, depending on the character the device represents, the capabilities of the device (e.g., whether the device has movement capabilities, dialogue capabilities, etc.) and so on.

Figure 12A:
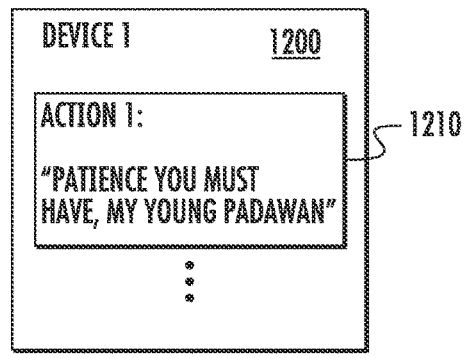
FIG. 12A-B illustrate device configuration information for storytelling devices, according to one embodiment described herein.
Figure 12B:
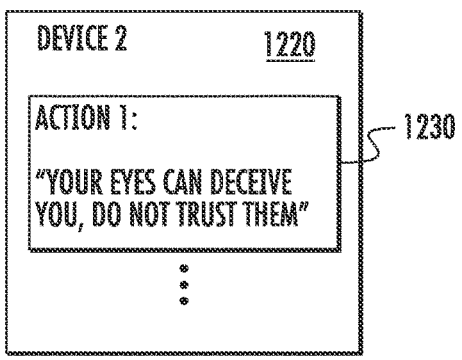

FIGS. 12A-B show an example of such a story. For purposes of this discussion, assume that the device 1200 represents a storytelling device based on a first fictional character and that the device 1220 represents a second storytelling device based on a second fictional character. Here, if the device 1200 is selected to perform the action "Action 10" responsive to an occurrence of event "E1" (e.g., the user failing to deflect the virtual laser), the device 1200 could output (e.g., using a text-to-speech synthesizer or a pre-recorded sound effect and one or more speaker devices) the dialogue 1210 of "Patience you must have, my young padawan." Likewise, if the action "Action 10" is mapped to the device 1220, the device 1220 could output the dialogue 1230 of "Your eyes can deceive you, do not trust them" in response to the user missing the virtual laser with the light sword device 1035. Advantageously, by abstracting the devices' actions using a class of actions, embodiments enable content producers to create stories for a wide variety of devices, and enable device manufacturers to determine how individual devices will implement each class of actions.

Moreover, while each of the actions 1210 and 1230 includes only dialogue for output by the devices 1200 and 1220, respectively, it is contemplated that any number of different actions can be specified, and that such actions may be performed in whole, in the alternative, conditionally (e.g., a particular action may only be performed if a variable within the global state of the storytelling experience exceeds a threshold amount), and so on. For example, a controller within the playgroup could maintain state information which includes a "force level" value for the user which indicates the user's current strength with the force, based on the current storytelling experience and/or previous storytelling experiences. Upon detecting a particular stimulus event has occurred, one of the storytelling devices could be configured to select an appropriate action to perform from a specified class of actions, based on the user's force level. As an example, if the device determines the user has a low force level (e.g., indicating the user is relatively new to the science fiction-themed stories and has not "leveled up" yet by playing a substantial number of previous stories), the device could select an action corresponding to an inexperienced space adventurer (e.g., the action 1210). On the other hand, if the device determines the user has a higher force level (e.g., indicating the user has completed a substantial number of science fiction-themed stories), the device could select an action within the class of actions that is contextually appropriate to a senior space adventurer. Advantageously, doing so allows the devices to perform actions that are contextually appropriate for a given user and a given storytelling experience.

In addition to state data characterizing the user, the storytelling devices may perform different events based on state data characterizing another one of the storytelling devices. For example, a particular action figure could appear loud and overbearing when in the presence of other storytelling devices having a low "force level", but could appear timid in the presence of storytelling devices having a high "force level." For instance, this may be achieved by the devices communicating their respective state data with each of the other devices, or could be orchestrated by a controller device collecting and aggregating each device's individual state data and configuring each of the devices accordingly.

In one embodiment, the storytelling devices may be configured to play out a dynamically created story, where a user specifies some general criteria defining the story and a controller device is configured to dynamically generate and/or retrieve story information satisfying the criteria. Doing so enables even unsophisticated or technically proficient users to dynamically create story content for playback using storytelling devices. For example, the user could specify that today is the user's birthday and the control device could proceed to dynamically generate (or retrieve) a story based on it being the user's birthday. As part of this, the control device could solicit input from the user (e.g., using dialogue spoken using one of the storytelling devices) to determine aspects the user wishes to be present in the dynamically generated story. For example, the user could specify he wishes the story to involve a particular storytelling device (e.g., a force glove) and the control device could generate a story that involves the specified storytelling device. In doing so, the control device may be configured (or may retrieve from a remote server) one or more story templates, and may use the templates together with the user's input to generate the story.

Generally, many storytelling devices can produce sound effects. For example, each action figure storytelling device representing a fictional could be configured to output dialogue in the character's voice. For example, such a storytelling device may be pre-loaded with audio recordings of the dialogue in the fictional character's voice. In one embodiment, the storytelling device can be configured to stream the audio recordings (e.g., from a streaming content server hosted by the control device). In some embodiment, the storytelling devices may communicate with one another through a protocol that cannot support the bandwidth for streaming audio in real-time. In such an embodiment, the storytelling devices may determine one or more audio recordings that will be needed for an upcoming portion of a story, and could begin streaming the determined audio recordings in advance, so as to ensure the audio recordings have been downloaded before the upcoming portion of the story is reached. The storytelling devices may also be configured with default actions (e.g., dialogue, actions, etc.) that could be used, in the event a particular audio recording is needed for playback in the story before the streaming is completed. In one embodiment, particular actions within the story may be designated as optional, where a storytelling device may omit the optional actions in the event corresponding content has not yet finished streaming.

Figure 13:
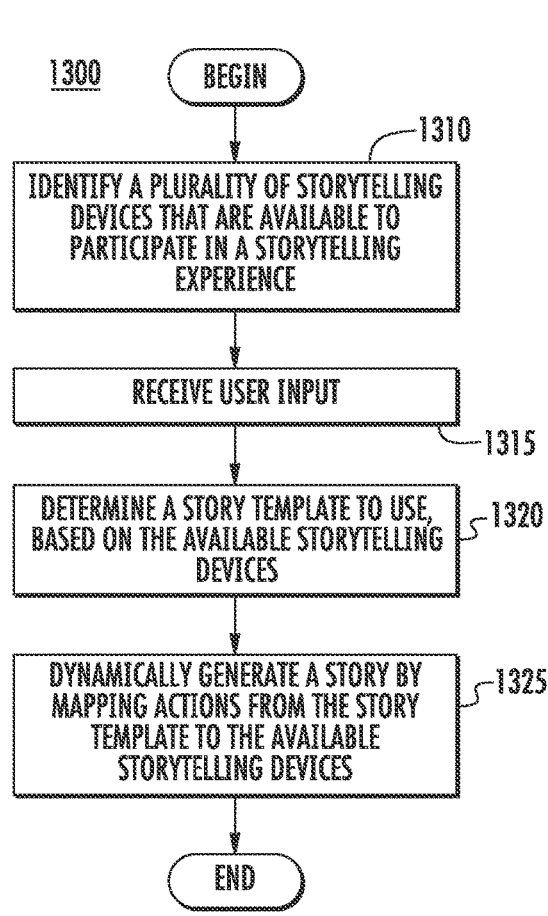
FIG. 13 is a flow diagram illustrating a method for dynamically creating a story, according to one embodiment described herein.

FIG. 13 is a flow diagram illustrating a method for dynamically creating a story, according to one embodiment described herein. As shown, the method 1300 begins at block 1310, where a controller component (e.g., logic running on an interactive storytelling device or, more generally, any other suitable device) identifies a plurality of storytelling devices that are available to participate in a storytelling experience. In one embodiment, it is preferable for the controller component to transmit a signal of a type that is known to substantially not to pass through barriers (e.g., walls of a home), so as to avoid including any storytelling devices outside of the proximate physical environment (e.g., a child's room) in the storytelling experience, e.g., storytelling devices located in a neighboring apartment. For example, the controller component could broadcast a signal (e.g., an infrared signal) and the storytelling devices could be pre-configured to transmit an acknowledgement signal upon receiving the broadcasted signal. Such an acknowledgement signal could further specify metadata describing the respective storytelling device, such as a model number of the storytelling device, capabilities of the storytelling device, and so on.

The controller component could then determine which storytelling devices are available to participate in the storytelling experience based on the received acknowledgement signals. In one embodiment, the controller component may determine that every device from which an acknowledgement signal was received is available to participate in the storytelling experience. In another embodiment, the controller component may further consider the metadata describing each storytelling device in making the determination. For example, if the controller component determines that a particular storytelling device currently has a low battery charge level and that such a charge is insufficient to complete the storytelling experience (or is likely to be insufficient), the controller component could determine that the particular storytelling device is unavailable for purposes of the current storytelling experience.

The controller component then receives user input from a user (block 1315). Generally, any suitable form of user input can be received, with examples including voice instructions from the user, physical actions performed by the user (e.g., detected using one or more camera devices), input from the user on a graphical user interface of a computing device and so on. For example, the controller component could solicit the user feedback by instructing a first available storytelling device to ask the user (e.g., by outputting audio dialogue using one or more speaker devices) what type of story the user would like to play. The user could then speak in response to the solicitation and the controller component could detect the user's response using one or more microphone devices. For example, the user could state that today is the user's birthday and that the user wishes to play a birthday-themed story. The controller component could generate audio data representing the user's response using one or more microphone devices and could analyze the audio data to determine that the user has requested a birthday story.

The controller component then selects a story template to use in dynamically generating a story for the user based on the available storytelling devices block 1320). For example, if the controller component determines that several Star Wars® themed storytelling devices are available, the controller component could select a story template relating to the Star Wars® theme for use in generating the story. In one embodiment, the controller component is further configured to select the story template based on the received user input. For instance, continuing the above example of a user specifying that today is his birthday, the controller component could select a story template corresponding to the Star Wars® theme and further relating to birthdays.

In one embodiment, the story templates can be stored locally on one or more computing devices (e.g., one of the interactive devices, a mobile device of the user, etc.). Additionally, the controller component can be configured to transmit a request for a story template to a remote server (e.g., a web application hosted within a cloud computing environment). Such a request could specify, for example, the plurality of storytelling devices that are available and information relating to the received user input (e.g., that the user wishes to play a birthday-themed story). Logic on the remote server could then perform a search of a story template data store (e.g., a database) in order to select a story template for the user.

In some embodiments, stories and story templates may be associated with various different pricing structures. For instance, in one embodiment, the user may be unable to use certain story templates until the user has acquired access to these templates (e.g., by purchasing the template on a per-template basis, as part of a monthly subscription plan, by purchasing the template as part of a bundle of multiple templates, by the user having previously played through a story generated using a pre-requisite story template, etc.).

Additionally, the received user input may specify other constraints as well. For instance, the user input could indicate that a particular available storytelling device should be included in the storytelling experience. For example, the controller component could determine that various Marvel® themed storytelling devices and various Star Wars® themed storytelling devices are both available. However, the user input could indicate that the user wishes a lightsaber storytelling device to be included in the current storytelling experience. As such, the controller component could restrict the determination of the story template to only Star Wars® themed story templates, based on the received user input.

The controller component then dynamically generates a story by mapping actions from the determined story template onto the available storytelling devices (block 1325), and the method 1300 ends. For example, the story template could specify an initial mapping of device roles to specific actions (e.g., as shown in FIG. 11 and discussed above) and the controller component could map the specific actions onto available storytelling devices that match the specified roles. The controller component can also consider other factors in mapping the actions onto the available devices. For example, if the received user input (at block 1315) indicates that the user wishes a particular storytelling device to be prominent throughout the story, the controller component could map a relatively larger number of actions onto the particular storytelling device consistent with the user's request. As another example, upon determining that a certain storytelling device has a relatively low battery power level, the controller component could map relatively smaller number of actions onto the storytelling device in order to ensure the storytelling device has sufficient battery charge to complete the storytelling experience.

Figure 14:
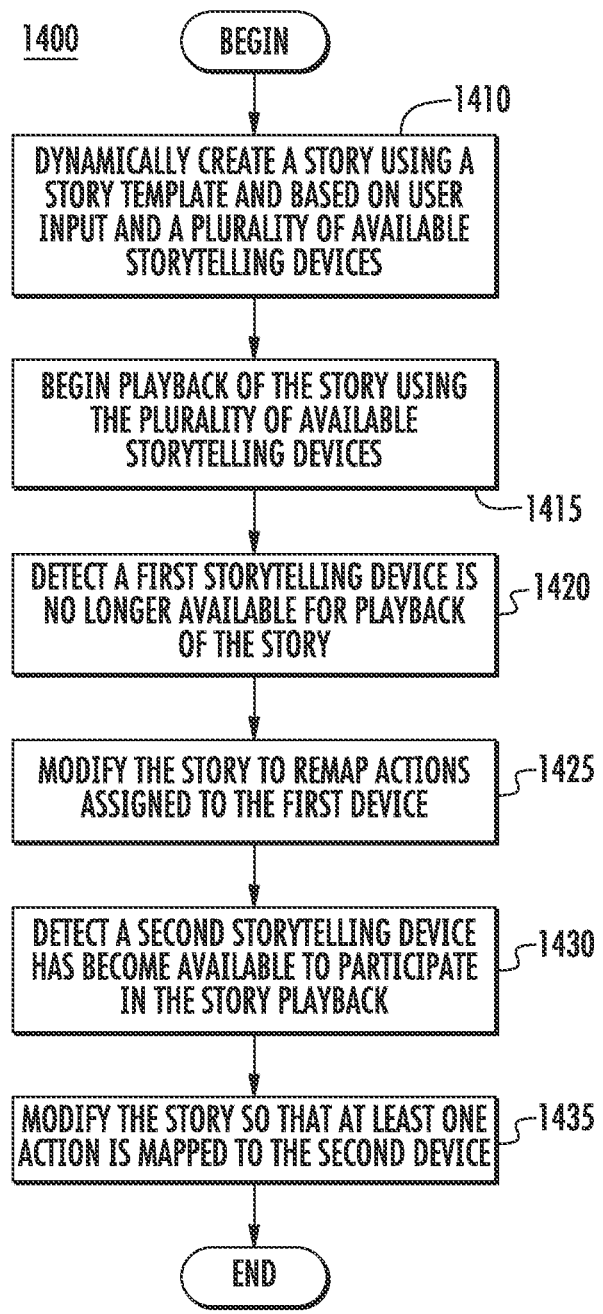
FIG. 14 is a flow diagram illustrating a method for dynamically creating and modifying a story, according to one embodiment described herein.

In addition to dynamically creating the story based on the currently available pool of storytelling devices, embodiments can be configured to dynamically modify a story based on changes to the pool of available storytelling devices. An example of this is shown in FIG. 14, which is a flow diagram illustrating a method for dynamically creating and modifying a story, according to one embodiment described herein. As shown, the method 1400 begins at block 1410, where the controller component dynamically creates a story using a story template and based on user input and a plurality of currently available storytelling devices. For example, the controller component could dynamically create the story using the method 1300 shown in FIG. 13 and discussed above.

The controller component then begins playback of the story using the plurality of available storytelling devices (block 1415). Generally, as discussed above, such playback begins at a starting point within the generated story and involves the various storytelling devices performing actions (e.g., responsive to a user action, responsive to an action performed by another one of the storytelling devices, etc.) and may proceed down one of potentially multiple branches within the story.

At some point during the playback of the story, the controller component detects that a first storytelling device is no longer available for the playback of the story (block 1420). Generally, a storytelling device could be considered unavailable for any number of different reasons. As an example, two children could be playing through the story together and when one of the children needs to go home, the child could take his storytelling device(s) with him, thereby removing them from the physical environment and making them unavailable to continue the playback of the story. As another example, a particular storytelling device could have insufficient levels of battery charge remaining to complete the playback of the story and thus the controller component could determine that the particular storytelling device has become unavailable to continue the playback of the story. Of course, such examples are provided for illustrative purposes only and are without limitation.

Upon determining the first storytelling device is no longer available for the playback of the current story, the controller component modifies the story to remap actions originally assigned to the first storytelling device (block 1425). For example, the controller component could remap the actions assigned to the first storytelling device to another suitable storytelling device within the plurality of storytelling devices. In doing so, the controller component may undo any device-specific customizations relating to the first storytelling device that were applied to the actions. As an example, assume the first storytelling device is a Hulk® action figure and further assume that the controller component originally selected a Hulk-specific cheering sound effect as the action to be performed by the first storytelling device. Upon determining the Hulk® storytelling device has become unavailable for the playback of the story, the controller component could instead remap the cheering action to an available Iron Man® storytelling device. Moreover, the controller component could modify the action to instead include an Iron Man-specific cheering sound effect, rather than the Hulk-specific sound effect originally included in the story. Doing so allows the story to continue uninterrupted despite storytelling devices being removed from the storytelling environment.

In one embodiment, the controller component can determine whether a particular action mapped to the first storytelling device is designated as critical to the story (e.g., based on a flag corresponding to the action within the dynamically created story). Upon determining that the action is not critical to the story, the controller component could simply remove the action from the story upon determining that the first storytelling device has become unavailable.

As shown in the method 1400, the controller component further determines during the playback of the story that a second storytelling device has become available to participate in the playback of the story (block 1430). For example, the playback of the story could begin with a first child and a first plurality of storytelling devices, and the child's friend could arrive during the playback of the story bringing an additional storytelling device(s) with him.

In response, the controller component modifies the story so that at least one action is mapped to the second storytelling device (block 1435), and the method 1400 ends. For instance, the controller component could remap at least one action assigned to another one of the storytelling devices to the second storytelling device, so that the assigned actions are better distributed amongst the available storytelling devices. For example, in dynamically creating the initial story, the controller component could have mapped an action for the role of "Hero" onto an Iron Man® storytelling device. Upon determining that a Hulk® action figure has become available during the playback of the story, the controller component could determine that the Hulk® action figure also belongs to the role of "Hero" and could remap the action from the Iron Man® storytelling device to the Hulk® storytelling device. Doing so allows the playback of the story to dynamically adjust to the currently available storytelling devices.

Technical Description

Figure 15:
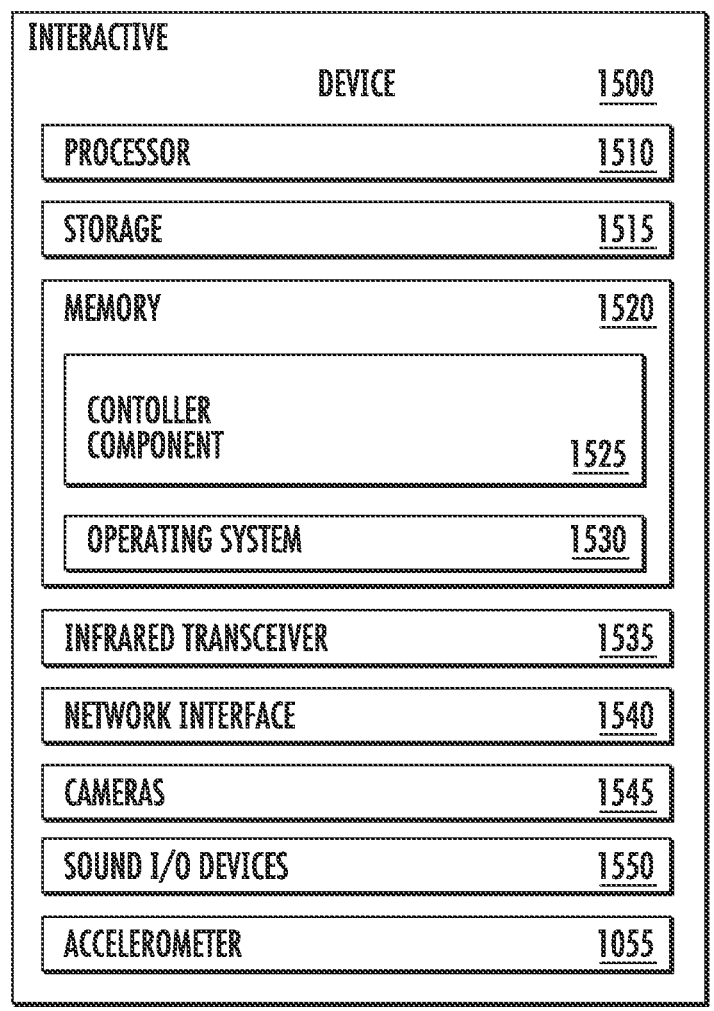
FIG. 15 is a block diagram illustrating a system configured with a controller component, according to one embodiment described herein.

An example of an interactive device is shown in FIG. 15, which is a block diagram illustrating an interactive device configured with a controller component, according to one embodiment described herein. In this example, the device 1500 includes, without limitation, a processor 1510, storage 1515, memory 1520, an infrared transceiver 1535, a network interface 1540, camera devices 1545, sound I/O devices 1550 and an accelerometer device 1555. Generally, the processor 1510 retrieves and executes programming instructions stored in the memory 1520. Processor 1510 is included to be representative of a single CPU, multiple CPUs, a single CPU having multiple processing cores, GPUs having multiple execution paths, and the like. The memory 1520 is generally included to be representative of a random access memory. The network interface 1540 enables the controller component 1525 to connect to a data communications network (e.g., wired Ethernet connection or an 802.11 wireless network).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 15, the memory 1520 represents any memory sufficiently large to hold the necessary programs and data structures. Memory 1520 could be one or a combination of memory devices, including Random Access Memory, nonvolatile or backup memory (e.g., programmable or Flash memories, read-only memories, etc.). In addition, memory 1520 and storage 1515 may be considered to include memory physically located elsewhere; for example, on another computer communicatively coupled to the interactive device 150. Illustratively, the memory 1520 includes a controller component 1525 and an operating system 1530. The operating system 1530 generally controls the execution of application programs on the interactive device 1500. Examples of operating system 1530 include UNIX, a version of the Microsoft Windows® operating system, and distributions of the Linux® operating system. Additional examples of operating system 1530 include custom operating systems for gaming consoles, including the custom operating systems for systems such as the Nintendo DS® and Sony PSP®.

The infrared transceiver 1535 represents any device capable of sending and receiving infrared signals. In another embodiment, a device 1500 that only sends or receives infrared signals may be configured with an infrared transmitter or a infrared receiver, respectively, as opposed to the infrared transceiver 1535. The sound I/O devices 1550 could include devices such as microphones and speakers. For example, the speakers could be used to produce sound effects (e.g., explosion sound effects, dialogue, etc.) and/or to produce vibration effects.

Generally, the controller component 1525 provides logic for the interactive device 1500. For example, the controller component 1525 could be configured to detect that a coded infrared signal has been received (e.g., using the infrared transceiver 1535). The controller component 1525 could then determine a type of the infrared signal (e.g., based on data specified within the coded infrared signal) and could determine a corresponding response based on the determined type. For example, the controller component 1525 could determine that the infrared signal corresponds to a repulsor ray blast (e.g., from the Iron Man® action figure) and, in response, could increment a counter of received repulsor ray blasts. Additionally, the controller component 1525 could perform a corresponding action based on the counter. For example, if the controller component 1525 determines that the detected repulsor ray blast is the first blast received, the controller component 1525 could output a roaring sound effect (e.g., using a speaker 1550) and could manipulate a servomechanism on the device 1500 to produce a rocking effect (e.g., by rotating a lever mechanism positioned in the base of the device 1500 slightly). As another example, if the controller component 1525 determines that the repulsor ray blast was the fifth blast received, the controller component 1525 could output a groaning sound effect (e.g., using speaker 1550) and could manipulate the servomechanism such that the device 1500 falls over (e.g., by rotating a lever mechanism until the device 1500 falls over).

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim (s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

Additional examples of storytelling devices and story management and creation techniques, as well as proximity detection techniques and communication protocols, are provided in the attached appendices.

While the foregoing is directed to embodiments of the present invention, other and further embodiments of the invention may be devised without departing from the basic scope thereof, and the scope thereof is determined by the claims that follow.

What is claimed is:

1. A method, comprising:
    identifying a plurality of storytelling devices available to participate in a storytelling experience, wherein each of the plurality of storytelling devices comprises an electronic device capable of performing at least one audiovisual effect, and wherein identifying comprises determining, for each of the plurality of storytelling devices, that the respective storytelling device is available, responsive to determining that a response signal was received from the respective storytelling device;

processing sensor data collected using one or more sensor devices to determine user input; retrieving a story template based at least in part on the plurality of storytelling devices;

dynamically creating a first story by mapping each action of a plurality of actions from the retrieved story template to a storytelling device in the plurality of storytelling devices, comprising, for each action of the plurality of actions:

determining a respective character classification, of a plurality of character classifications, to which the action can be assigned, based on the retrieved story template, each of the plurality of character classifications being based on a respective character represented by a respective one of the storytelling devices; and mapping the action to a respective storytelling device of the plurality of storytelling devices, the storytelling device determined to belong to the respective character classification based on metadata describing the storytelling device; and transmitting instructions to each of the plurality of storytelling devices to configure control logic within the respective storytelling device to perform a respective one or more actions mapped to the respective storytelling device, in response to determining that a respective one or more conditions for each of the one or more actions are satisfied, wherein dynamically creating the first story by mapping each action of a plurality of actions from the retrieved story template to a storytelling device in the plurality of storytelling devices further comprises:

selecting one of the one or more of the plurality of storytelling devices to assign the action to, wherein the selection of at least one of the plurality of storytelling devices is based on the user input, and wherein a first one of the plurality of actions represents a dialogue action, and wherein dynamically creating the first story by mapping each action of a plurality of actions from the retrieved story template to a storytelling device in the plurality of storytelling devices further comprises:

upon selecting the storytelling device to assign the action to, adapting dialogue to be output by the selected storytelling device in performing the dialogue action, based on the character represented by the selected storytelling device.

2. The method of claim 1, wherein dynamically creating a first story by mapping actions from the retrieved story template to storytelling devices in the plurality of storytelling devices, based at least in part on the user input further comprises:

selecting one of the plurality of storytelling devices for inclusion in the storytelling experience, based on determining that the user input corresponds to the storytelling device.

3. The method of claim 1, wherein identifying a plurality of storytelling devices available to participate in a storytelling experience further comprises:

broadcasting an infrared signal within a physical environment; and for each of the plurality of storytelling devices, upon receiving a respective acknowledgement signal from the storytelling device, determining that the storytelling device is available to participate in the storytelling experience.

4. The method of claim 1, wherein identifying a plurality of storytelling devices available to participate in a storytelling experience further comprises:

transmitting a status request to a first storytelling device, requesting status information from the first storytelling device relating to the storytelling experience;

upon receiving a confirmation message from the first storytelling device in response to the transmitted status request, determining that the first storytelling device is available to participate in the storytelling experience; and upon receiving a message from the first storytelling device indicating that the first storytelling device is unable to participate in the storytelling experience, determining that the first storytelling device is unavailable to participate in the storytelling experience.

5. The method of claim 4, wherein the received message comprises a low power message, indicating that the first storytelling device has an insufficient battery power level to complete the storytelling experience.

6. The method of claim 1, wherein retrieving a story template based at least in part on the identified plurality of storytelling devices is further based on the user input.

7. The method of claim 6, wherein receiving user input associated with the storytelling experience further comprises:

collecting user speech data using one or more sensor devices; and processing the collected user speech data to determine the user input.

8. The method of claim 1, wherein dynamically creating a first story by mapping actions from the retrieved story template to storytelling devices in the plurality of storytelling devices is further based at least in part on an interaction history of the user in one or more previous storytelling experiences.

9. The method of claim 8, wherein the interaction history of the user further comprises one or more state-based variables, each having a value determined based on the one or more previous storytelling experiences.

10. The method of claim 1, further comprising:

electing one of the plurality of storytelling devices to serve as a controller device during the playback of the first story, based at least in part on data describing capabilities of the elected storytelling device.

11. The method of claim 1, further comprising:

initiating playback of the dynamically created first story using the plurality of storytelling devices.

12. The method of claim 11, further comprising:

upon determining that a first one of the plurality of storytelling devices has become unavailable to continue to participate in the playback of the first story, modifying at least a first mapped action within the first story corresponding to the first device.

13. The method of claim 11, further comprising:

upon determining that a first storytelling device not included in the plurality of storytelling devices has become available to participate in the playback of the first story, mapping a first mapped action within the first story currently mapped to a second storytelling device to instead map to the first storytelling device.

14. The method of claim 11, further comprising:

upon determining that a first storytelling device not included in the plurality of storytelling devices has become available to participate in the playback of the first story, inserting a new action within the first story based on the story template; and mapping the inserted new action to the first storytelling device, such that the first storytelling device will perform one or more actions during the playback of the first story as a result of the mapping.

15. The method of claim 1, wherein the performed one or more actions comprise at least one of (i) outputting a sound effect using one or more speaker devices of one of the plurality of storytelling devices, (ii) controlling movement of one of the plurality of storytelling devices, and (iii) transmitting a signal using at least one signal transmitter device of one of the plurality of storytelling devices.

16. A non-transitory computer-readable medium comprising computer program code that, when executed by operation of one or more computer processors, performs an operation comprising:
    identifying a plurality of storytelling devices available to participate in a storytelling experience, wherein each of the plurality of storytelling devices comprises an electronic device capable of performing at least one audiovisual effect, and wherein identifying comprises determining, for each of the plurality of storytelling devices, that the respective storytelling device is available, responsive to determining that a response signal was received from the respective storytelling device;
    receiving user input associated with the storytelling experience;
    retrieving a story template based at least in part on the plurality of storytelling devices;
    dynamically creating a first story by mapping each action of a plurality of actions from the retrieved story template to a storytelling device in the plurality of storytelling devices, comprising, for each action of the plurality of actions:
        determining a respective character classification, of a plurality of character classifications, to which the action can be assigned, based on the retrieved story template, each of the plurality of character classifications being based on a respective character represented by a respective one of the storytelling devices; and
        mapping the action to a respective storytelling device of the plurality of storytelling devices, the storytelling device determined to belong to the respective character classification based on metadata describing the storytelling device; and
    transmitting instructions to each of the plurality of storytelling devices to configure control logic within the respective storytelling device to perform a respective one or more actions mapped to the respective storytelling device, in response to determining that a respective one or more conditions for each of the one or more actions are satisfied,
    wherein dynamically creating the first story by mapping each action of a plurality of actions from the retrieved story template to a storytelling device in the plurality of storytelling devices further comprises:
    selecting one of the one or more of the plurality of storytelling devices to assign the action to, wherein the selection of at least one of the plurality of storytelling devices is based on the user input, and
    wherein a first one of the plurality of actions represents a dialogue action, and wherein dynamically creating the first story by mapping each action of a plurality of actions from the retrieved story template to a storytelling device in the plurality of storytelling devices further comprises:
    upon selecting the storytelling device to assign the action to, adapting dialogue to be output by the selected storytelling device in performing the dialogue action, based on the character represented by the selected storytelling device.

17. A system, comprising:
    a plurality of storytelling devices, wherein each of the plurality of storytelling devices comprises an electronic device capable of performing at least one audiovisual effect; and control logic configured to perform an operation, comprising:
    determining that the plurality of storytelling devices are available to participate in a storytelling experience, comprising determining, for each of the plurality of storytelling devices, that the respective storytelling device is available, responsive to determining that a response signal was received from the respective storytelling device;
    receiving user input associated with the storytelling experience;
    retrieving a story template based at least in part on the plurality of storytelling devices;
    dynamically creating a first story by mapping each action of a plurality of actions from the retrieved story template to a storytelling device in the plurality of storytelling devices, comprising, for each action of the plurality of actions:
        determining a respective character classification, of a plurality of character classifications, to which the action can be assigned, based on the retrieved story template, each of the plurality of character classifications being based on a respective character represented by a respective one of the storytelling devices; and
        mapping the action to a respective storytelling device of the plurality of storytelling devices, the storytelling device determined to belong to the respective character classification based on metadata describing the storytelling device; and
    transmitting instructions to each of the plurality of storytelling devices to configure control logic within the respective storytelling device to perform a respective one or more actions mapped to the respective storytelling device, in response to determining that a respective one or more conditions for each of the one or more actions are satisfied,
    wherein dynamically creating the first story by mapping each action of a plurality of actions from the retrieved story template to a storytelling device in the plurality of storytelling devices further comprises:
    selecting one of the one or more of the plurality of storytelling devices to assign the action to, wherein the selection of at least one of the plurality of storytelling devices is based on the user input, and
    wherein a first one of the plurality of actions represents a dialogue action, and wherein dynamically creating the first story by mapping each action of a plurality of actions from the retrieved story template to a storytelling device in the plurality of storytelling devices further comprises:
    upon selecting the storytelling device to assign the action to, adapting dialogue to be output by the selected storytelling device in performing the dialogue action, based on the character represented by the selected storytelling device.

18. The system of claim 17, wherein dynamically creating a first story by mapping actions from the retrieved story template to storytelling devices in the plurality of storytelling devices, based at least in part on the user input further comprises:

selecting one of the plurality of storytelling devices for inclusion in the storytelling experience, based on determining that the user input corresponds to the storytelling device.

\* \* \* \* \*

UNITED STATES PATENT AND TRADEMARK OFFICE
CERTIFICATE OF CORRECTION

| | |
|---|---|
| PATENT NO. | : 9,836,984 B2 |
| APPLICATION NO. | : 14/486230 |
| DATED | : December 5, 2017 |
| INVENTOR(S) | : Eric C. Haseltine et al. |

Page 1 of 1

It is certified that error appears in the above-identified patent and that said Letters Patent is hereby corrected as shown below:

In the Drawings

On sheet 10 of 10, in Figure 15, reference numeral 1525, Line 1, delete "CONTOLLER" and insert -- CONTROLLER --, therefor.

In the Specification

In Column 2, Line 28, delete "FIG." and insert -- FIGS. --, therefor.

In Column 8, Line 17, delete "Wars@-" and insert -- Wars®- --, therefor.

Signed and Sealed this
First Day of May, 2018

Andrei Iancu
*Director of the United States Patent and Trademark Office*